United States Patent [19]

Baller

[11] Patent Number: 5,047,776
[45] Date of Patent: Sep. 10, 1991

[54] MULTIBEAM OPTICAL AND ELECTROMAGNETIC HEMISPHERICAL/SPHERICAL SENSOR

[75] Inventor: Howard Baller, Marina Del Rey, Calif.

[73] Assignee: Hughes Aircraft Company, Los Angeles, Calif.

[21] Appl. No.: 545,313

[22] Filed: Jun. 27, 1990

[51] Int. Cl.$^5$ .................. G01S 13/86; H01Q 15/08
[52] U.S. Cl. .................. 342/52; 343/911 L; 359/664; 356/141
[58] Field of Search ............. 342/52; 343/911 L; 350/104, 106, 416; 356/141

[56] References Cited

U.S. PATENT DOCUMENTS

| | | | |
|---|---|---|---|
| 2,943,358 | 7/1960 | Hutchins et al. | 343/911 L |
| 3,757,333 | 9/1973 | Procopio | 343/911 L |
| 3,787,872 | 1/1974 | Kauffman | 343/911 R |
| 3,791,808 | 2/1974 | Thomas | 501/7 X |
| 4,288,337 | 9/1981 | Ota et al. | 343/911 L X |
| 4,359,741 | 11/1982 | Cassel | 343/911 L X |
| 4,523,198 | 6/1985 | Clapp | 343/754 |
| 4,531,129 | 7/1985 | Bonebright et al. | 343/911 L X |

Primary Examiner—Gilberto Barrón, Jr.
Attorney, Agent, or Firm—Leonard A. Alkov; Wanda K. Denson-Low

[57] ABSTRACT

An optical spherical Luneburg lens is described which is also useful for millimeter wave and microwave operation, which can provide a multitude of simultaneously acting receiving beams over a hemispherical or spherical field of view. When used in conjunction with surface mounted optical/radio frequency pickup elements, the lens can be employed in a passive target detection system of unique field of coverage and sensitivity. The lens comprises a center sphere of refractive index of approximately $\sqrt{2}$, around which are arranged in concentric shells of aerogel material. The aerogel material of the respective shells is fabricated to obtain a particular index of refraction approximately equal to $(2-(r/r_0)^2)^{\frac{1}{2}}$, where r is the radius of the shell and $r_0$ is the radius of the lens assembly. The lens can be employed in a system providing dual mode simultaneous optical and radio frequency operation with a single aperture. Its multibeam simultaneous detection capability can provide an input to advanced digital signal processors to perform automatic image and pattern recognition for commercial and military sensor systems. It may also be used as an active sensor using optical or radio frequency energy.

29 Claims, 8 Drawing Sheets

MULTIBEAM OPTICAL AND ELECTROMAGNETIC HEMISPHERICAL/SPHERICAL SENSOR

BACKGROUND OF THE INVENTION

The present invention relates to optical and electromagnetic sensor systems, and more particularly to such systems which employ spherical or hemispherical Luneburg lens.

Figure 1:
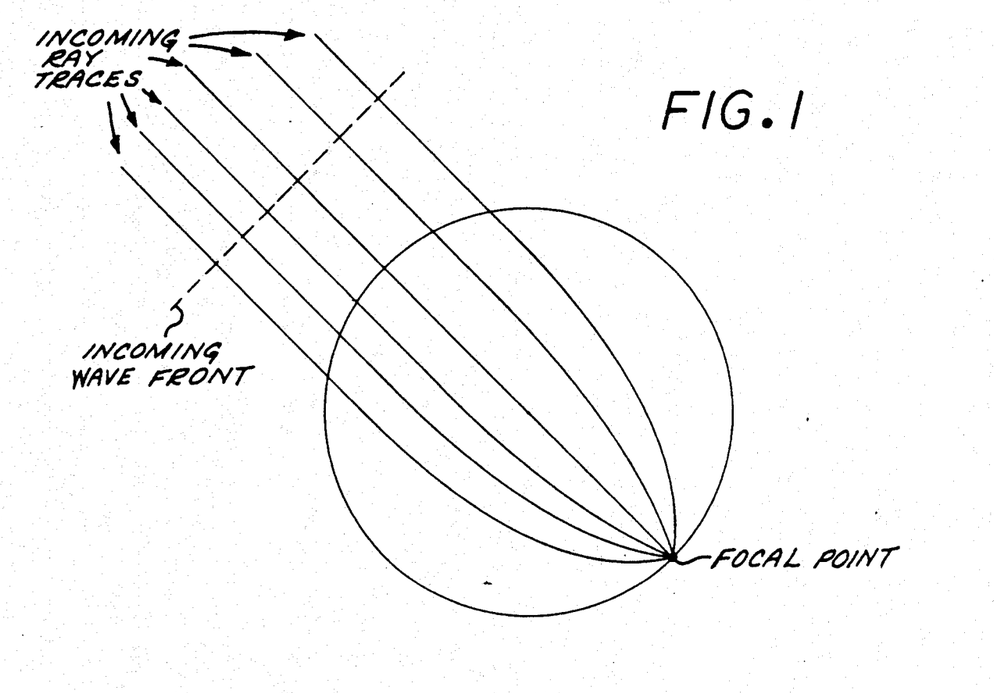
FIG. 1 illustrates the focusing property of the Luneburg lens.

Luneburg lens were first proposed by R. K. Luneburg in the 1940's, and are discussed in his textbook "Mathematical Theory of Optics", R. K. Luneburg, University of California Press, Berkeley and Los Angeles, 1964, Library of Congress Catalog #64-19010, pages 187–188. The Luneburg lens may be described simply as a sphere whose index of refraction is graded radially from its center to the outer surface according to the relationship $n(r) = (2 - r^2)^{\frac{1}{2}}$. The Luneburg lens has the property that plane waves from a distant source are imaged at the end of the diameter of the lens which is in the direction of the incoming wave. This property is illustrated in FIG. 1.

However, to applicant's knowledge, no light-gathering Luneburg lens has ever been built and used successfully. Poor approximations have been made but the lack of a suitable material (glass) of the required index of refraction prevented realization. Some radar antennas, which provide hemispherical coverage, have been used for ground based surveillance radar with excellent results; the radial gradation of refractive index was achieved by dielectric loading of a foam low-dielectric constant medium.

It would therefore represent an advance in the art to provide a Luneburg lens useful at optical and millimeter wave frequencies.

The technology of low-refractive index optical materials has been studied, although the focus of applications has been for uses in insulating transparent spacers for house walls and windows, and lately as materials for Cerenkov radiation detectors. One class of such materials is known as aerogels. See, e.g., "Aerogels," J. Fricke, Scientific American, May, 1988, pages 92–97. Rayleigh scattering of light is observed from such materials, which occurs in a medium which contains inhomogeneities smaller than the visible wavelength itself. This indicates that the microscopic structure of these materials consists of primary particles smaller than 1 nanometer. The process of manufacture can produce a very light material whose density is only a few percent of that of ordinary glass by evaporating the liquid used in manufacture and leaving a delicate skeleton structure of silicon.

The properties of aerogel are quite remarkable. Achievable density can be small compared to ordinary solids. Its refractive index, depending on the process of manufacture, has been made as low as 1.02, or can be made larger, for example, $\sqrt{2}$, by manufacturing the aerogel material with increased density. Applied merely as a thermal insulator, it may have one third the conduction of double pane silver coated glass panels containing argon gas, which is thought to be very effective.

SUMMARY OF THE INVENTION

In accordance with the invention, a lens is provided, wherein a plurality of concentric shells of dielectric aerogel material are arranged around a center sphere of material characterized by a refractive index of approximately $\sqrt{2}$. The lens has an outer radius $r_o$, and the radius of each shell is characterized by a typical radius value $r$. The aerogel materials from which the respective shells are fabricated are such that the respective refractive index of each shell is substantially equal to $(2 - (r/r_o)^2)^{\frac{1}{2}}$. The lens' operation is characterized in that planar electromagnetic wave fronts incident on the lens from a distant source are imaged at a focus point on the lens surface at the end of the diameter of the lens in the direction of the incoming wave front.

In accordance with another aspect of the invention, sensor elements each respectively responsive to the energy imaged at a particular focus point on the lens surface are provided, and generate electrical sensor signals indicative of the imaged energy. Such sensor elements may include optical sensors such as photosensitive semiconductor detector elements which are either directly bonded to the lens surface at the focus points or are coupled to the focus points through optical fibers. The sensors may also include millimeter wave or microwave sensors such as metal horns and RF diode detector elements secured to particular focus points.

When the lens is to have a hemispherical view of view, the focus points for the sensor elements are located on one hemispherical surface of the lens, leaving unobscured a second hemispherical surface portion of the lens on which is incident the electromagnetic energy. The lens may also be configured to have a substantially spherical field of view, by dispersing the focus points over the entire surface of the lens, without occluding a large portion of the receiving aperture.

The electrical sensor outputs can be processed to select the beam or beams required for a particular application. For example, the signals from all the sensors may be selectively sampled under control of a pattern scan controller, e.g., to perform edge detection or spotlight pattern scans, or a complete hemispherical or spherical scan. The selected signals are then converted to digital form and processed by a digital computer implementing a process function for the particular application, such as image tracking, pattern recognition, feature recognition, or other image processing algorithms.

Since the dielectric characteristics of the shells are effective over a broad range of frequencies in the input radiation, the lens may be employed in an optical and/or millimeter wave or microwave passive sensor system. In a further embodiment, the sensor elements are replaced by transducer elements capable of active transmission and reception of electromagnetic energy. With appropriate transmitter and receiver elements, the system may comprise a radar system capable of simultaneous optical and microwave multibeam operation.

The lens can therefore be employed to provide a multitude of simultaneously acting receiving beams over a hemispherical or spherical field. When used in conjunction with spherical surface-mounted optical/radio frequency detector elements, the lens can comprise a passive target detection system of unique field of coverage and sensitivity. The sensor can provide an input to a digital signal processor to perform such functions as automatic image and pattern recognition for sensor systems. Further, when operated in conjunction with transmitter elements, the lens can provide dual mode (electro-optical and RF) operation with a single aperture.

BRIEF DESCRIPTION OF THE DRAWINGS

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 2A:
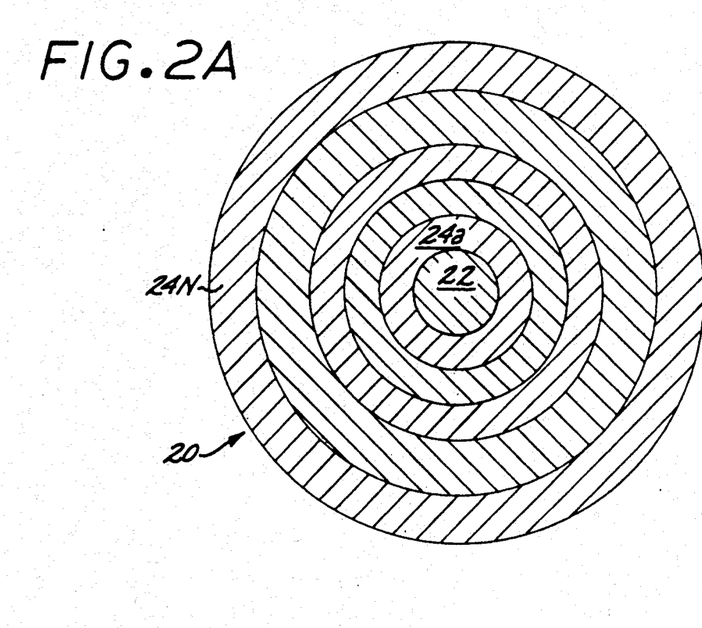
FIG. 2A is a cross-sectional side view taken through a Luneburg lens fabricated with concentric aerogel shells in accordance with the invention.

Referring now to FIG. 2A, the aerogel Luneburg lens 20 in accordance with the invention is constructed as a nested group of spherical dielectric shells enveloping a center sphere 22. The center sphere 22 is constructed of a material of refractive index of approximately $\sqrt{2}$. The shells 24A–24N are formed of dielectric aerogel material whose refractive index is controlled to approximate the variation of the equation:

$$\text{refractive index} \approx (2 - (r/r_o)^2)^{\frac{1}{2}} \tag{1}$$

where r is the radius of each shell, and $r_o$ the radius of the outermost shell. It will be apparent that the smaller the thickness of each shell, the better the approximation of the lens 20 as an ideal Luneburg lens, and the more accurate the beamforming capabilities.

Aerogels have been fabricated from many dielectric materials, including silica, cellulose and gelatin.

An exemplary material suitable for use as the center sphere is marketed by Airglass A.B. in Sweden in the form of high porosity bricks. Higher density bricks are made at Lawrence Livermore National Laboratory using a modified commercial process. Generally, the homogeneity of the aerogel bricks is so good that radiography has insufficient resolution to characterize it. A simple relationship, known as the Dale-Gladstone law, exists between the density $\rho$ and the index of refraction, i.e., $n = 1 + k\rho$, because a measure of the refractive index also gives a measure of the bulk density. The constant k has been determined from known values of $SiO_2$ for n and $\rho$ to be equal to 0.21. Thus $\rho = (n-1) + 0.21$ is the relationship between bulk density and refractive index n for silica aerogel. "Optical Characteristics of Aerogel Glass," L. W. Hrubesh, Report UCRL 53794, July 1987, at pages 1 and 23, Lawrence Livermore National Laboratory, available from National Technical Information Service, U.S. Department of Commerce, Springfield, Va. 22161.

The refractive index values required by this invention can be achieved by manufacturing the aerogel with values of density, $\rho$, according to the formula above. The density of the aerogel material is controlled by the pressure used in the baking and drying process of manufacture; increased pressure yields increased density.

The center sphere 22 and the concentric dielectric shells 24A–24N can each be machined from a brick of dielectric aerogel material of the appropriate density to achieve the necessary dielectric constant.

Figure 2B:
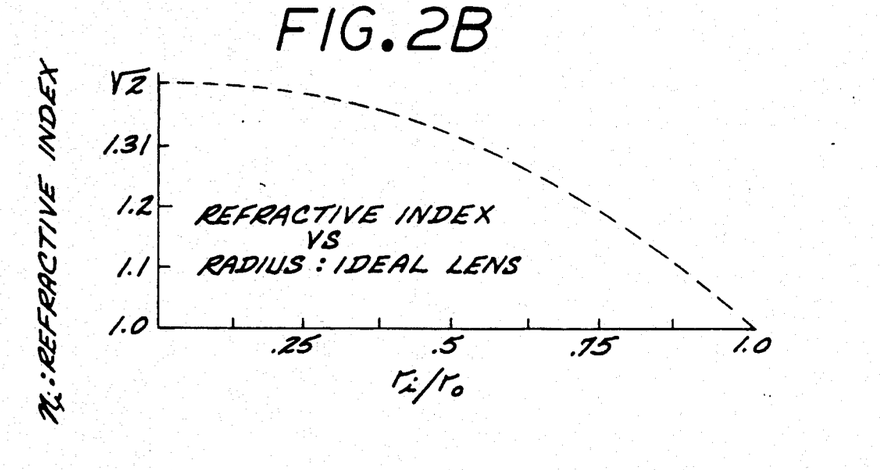
FIG. 2B depicts the ideal continuous gradation of refractive index for the lens of FIG. 1.
Figure 2C:
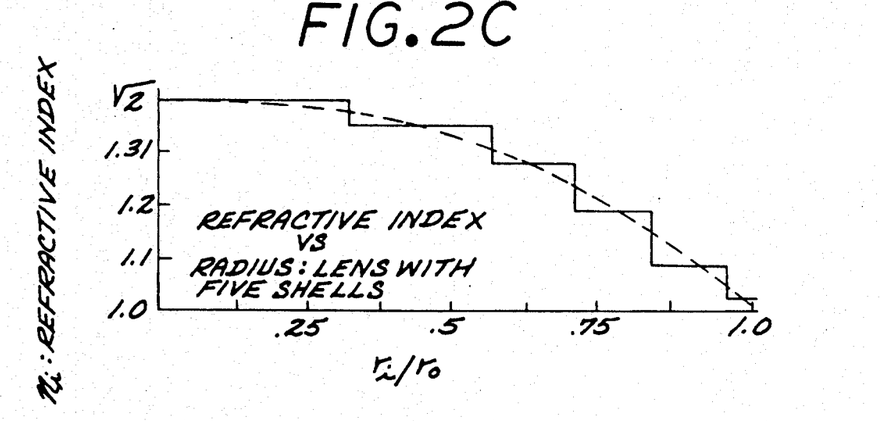
FIG. 2C and FIG. 2D illustrate possible choices of the number of shells for the lens of FIG. 2A and individual thickness of each concentric layer which are chosen in each individual application to provide optimal results in cost or achieved resolution.
Figure 2D:
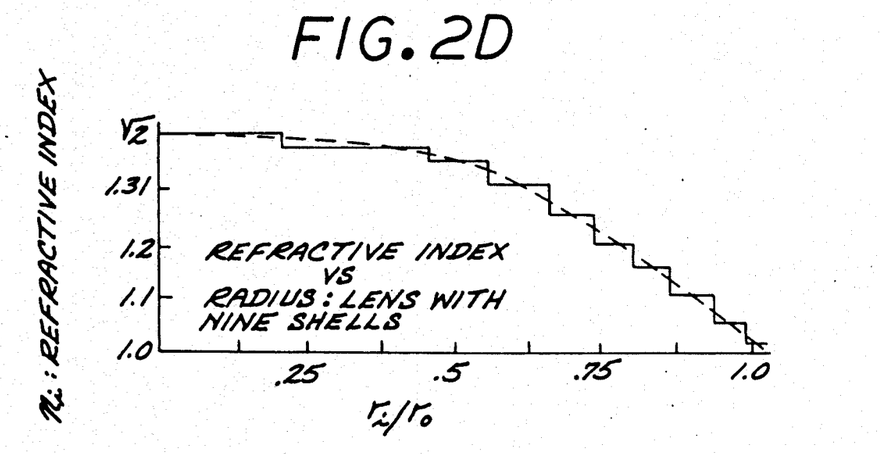

FIG. 2B is a graph plotting the refractive index as a function of $r_l/r_o$ for an ideal Luneburg lens. FIG. 2C plots the refractive index as a function of $r_l/r_o$ for an exemplary lens in accordance with the invention and having five aerogel shells surrounding the center sphere. FIG. 2D plots the refractive index as a function of $r_l/r_o$ for a second exemplary lens in accordance with the invention and having nine aerogel shells surrounding the center sphere.

Figure 3:
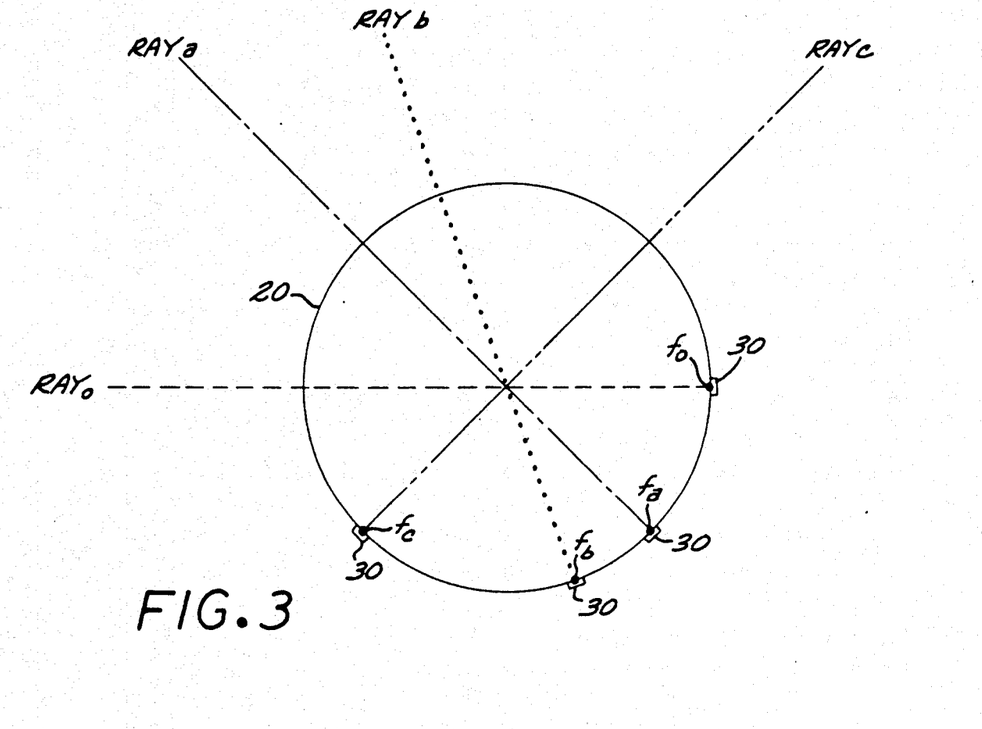
FIG. 3 is a schematic view illustrating the simultaneous multibeam focusing capability of a Luneburg lens in accordance with the invention.

Referring now to FIG. 3, mounted on the exterior of the lens 20 as densely as needed to obtain the number of beams desired for a particular application are optical or radio frequency detectors 30. Some of the field of view for spherical coverage is obscured by the detectors; this is no limitation for hemispherical coverage although two separate lenses might be required for some spherical coverage systems. The spatial distribution of the detectors 30 over the lens surface is determined by the system requirements according to the number of beams desired.

The signals from each detector 30 are representative of the beam output for the particular beam focused at the detector. This is illustrated in FIG. 3, showing beams depicted by center rays o, a, b, c incident on the lens 20 and being focused at focus points $f_o$, $f_a$, $f_b$, $f_c$. The number of available beams is limited only by the size of the pickoffs located on the surface at the focus points. The signals are processed further in a general purpose or special purpose computer.

Figure 4:
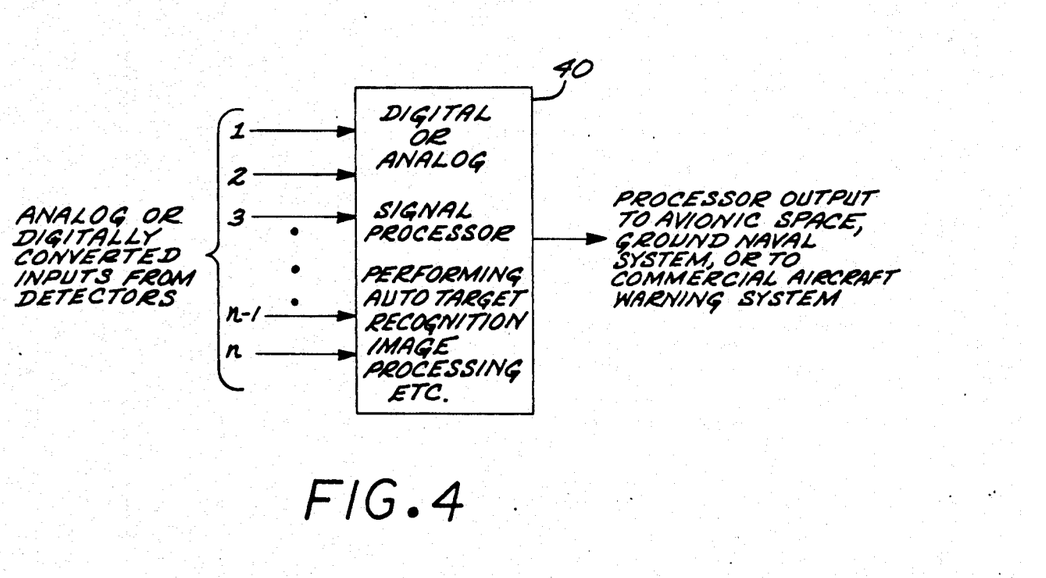
FIG. 4 is a schematic diagram showing the signal processor used to process the data in analog or digitized form from the signal pickoff devices on the Luneburg lens surface.

The detector elements 30 provide parallel simultaneous signals to an input to a digital signal processor either directly in analog form or after digitization in an A/D converter. FIG. 4 illustrates the signals from the various signal pickup devices in analog or digitally converted form to a digital or analog signal processor 40. The particular functions performed by the processor 40 will depend on the particular application, and may include such exemplary functions as automatic target recognition or image processing. The processed output signals from the processor 40 are then employed by the particular utilization device, such as an avionic, space, ground or naval system, or an aircraft collision warning system. The output signals may also be used to improve detection sensitivity and to perform multisensor fusion with other sensors or by joint simultaneous processing of optical and radar detections performed simultaneously by the lens system itself.

Figure 5A:
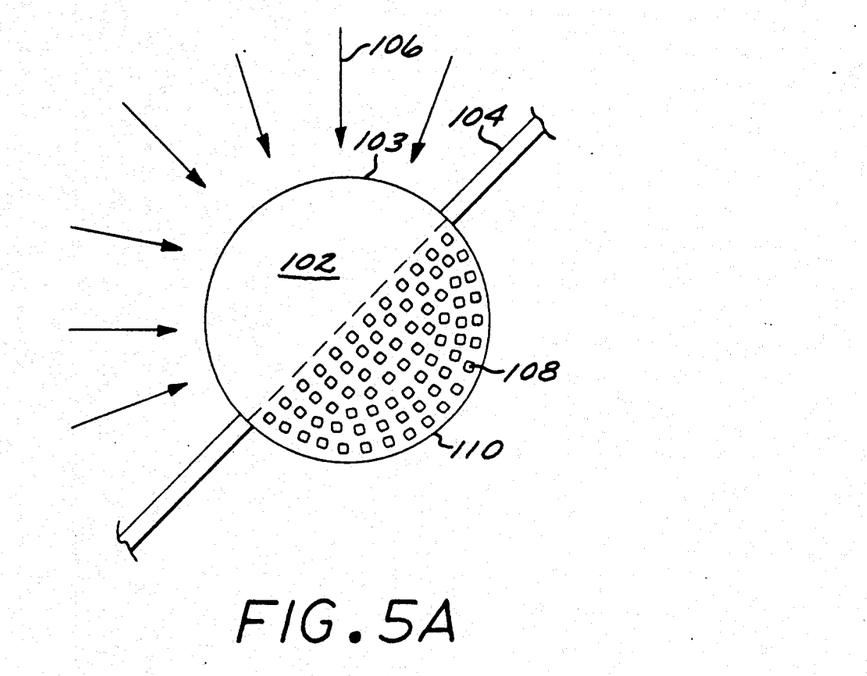
FIG. 5A shows a Luneburg optical lens employed to form simultaneous multiple beams with a hemispherical field of view, and employing semiconductor pickoff devices.
Figure 5B:
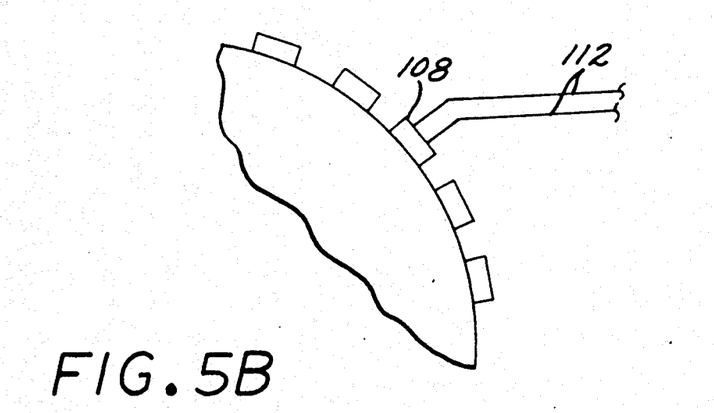
FIG. 5B is a schematic block diagram of a sensor system employing the Luneburg lens of FIG. 5A.
Figure 5C:
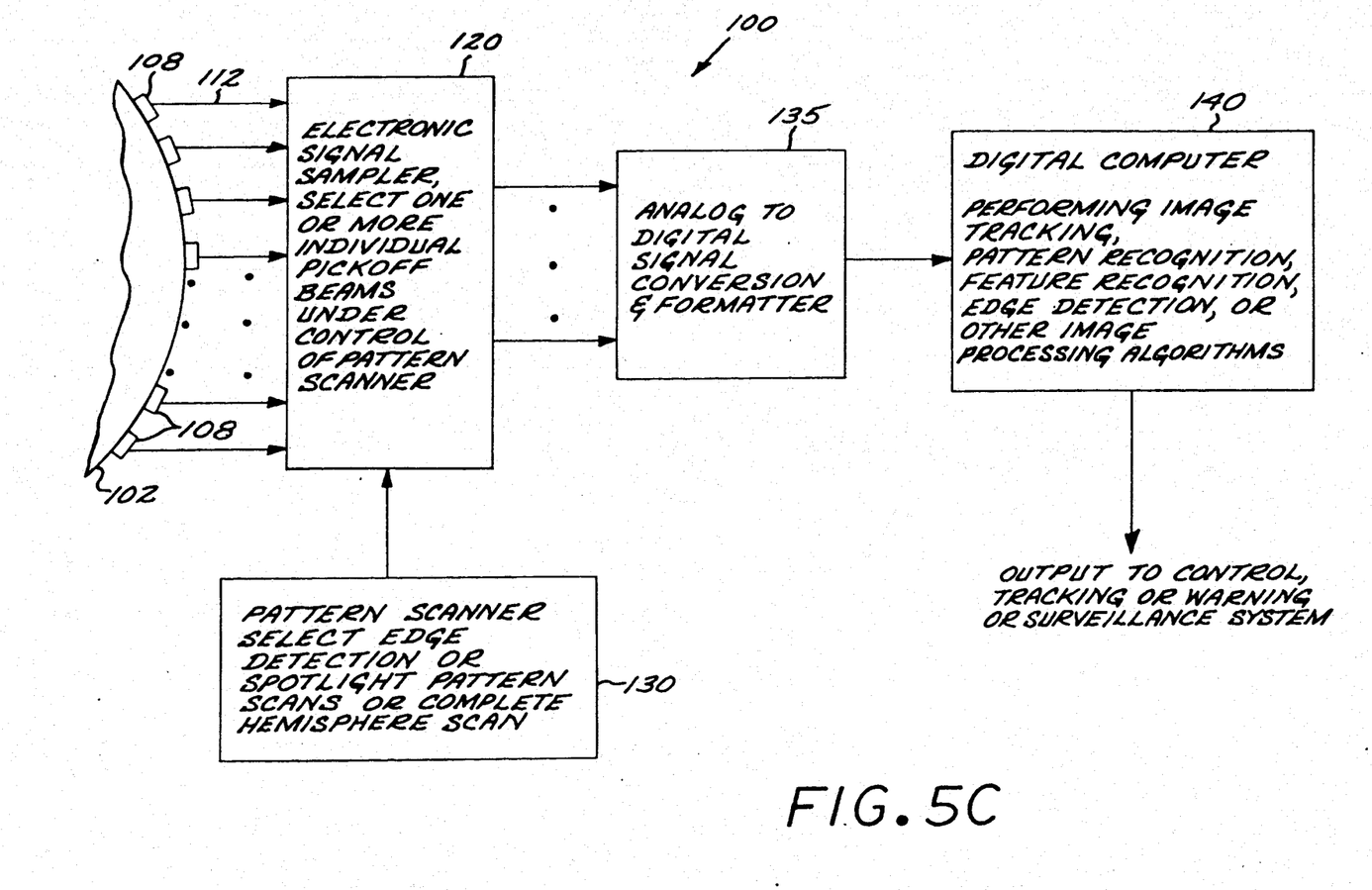

Particular exemplary embodiments of systems employing the lens in accordance with the invention will now be discussed. FIGS. 5A-5C show a simultaneous multibeam sensor system 100 having a hemispherical field of view. The system 100 includes a Luneburg lens 102 as described with respect to FIGS. 2-4 above. The lens 102 is secured in position by a mounting surface element 104 so that a first hemispherical surface 103 thereof is exposed to incoming signals indicated generally by beams 106 potentially coming from all directions of the hemispherical field of view.

A plurality of semiconductor photosensitive detector elements 108 are secured to the second hemispherical surface 110 of the lens 20 beneath the mounting surface 104. As shown more fully in FIG. 5B, the detectors 108 are bonded to the outer surface of the outermost aerogel shell comprising the lens 102. Output signal leads 112 connect the respective detector chips 108 to the electronic signal sampler 120. The detector chips 108 are responsive to the particular wavelength or wavelengths of interest, e.g., infrared radiation. Semiconductor detectors sensitive to infrared radiation are commercially available. Photodetectors sensitive to visible radiation are also commercially available.

The function of the electronic signal sampler 120 is to select one or more individual beams from the detectors 108 under control of the pattern scanner 130. The pattern scanner 130 may control the sampler 120 to select edge detection or spotlight pattern scans, or a complete hemisphere scan, for example. The functions carried out by the signal sampler 120 include, but are not limited to, those listed below:

a. peak detection: this function selects the largest signal from those available from all sensor detectors and provides angle information on the direction of this signal.

b. edge detection: this function selects straight line or curved edges separating an empty portion of the field of view from a portion with many signals; these algorithms usually sample a square array of elements and by addition and subtraction of the signal amplitudes are able to identify edges. The shape of the edge (linear, curved, or serrated) is used to identify the type of object. Aircraft, for example, are identified by comparison of edge profiles with known shapes.

c. separation of clutter or background signals from target: this function is performed by subjecting the signals to a statistical analysis in which clutter statistics are more random in angle or time distribution and less structured than signals from desired targets. By this means, objects of interest can be seen against a background of interference, such as trees, clouds, or ocean.

d. spotlight scan: this function allows detailed view of a small portion of the field of regard when the initial scan does not provide recognition by any of the above mentioned or other functions.

e. moving object tracking: this function processes signals by comparing the observed view from one instant to a later observation. When the background is slow to change, the presence of a moving target and information on its speed can be determined by comparison of subsequent observations.

The functions carried out by the signal sampler 120 are known in the radar, video camera, weather display and other graphic screen controls, optical map imagery, optical tracker and imagery coordinate transformations arts.

The selected beams are then sent to the analog-to-digital signal converter and formatter circuits 135. The resulting converted and formatted signals are then sent to the digital computer 140, for performing such functions as image pattern recognition, tracking, feature recognition, edge detection or other image processing algorithms, as required by the particular system application.

Figure 6A:
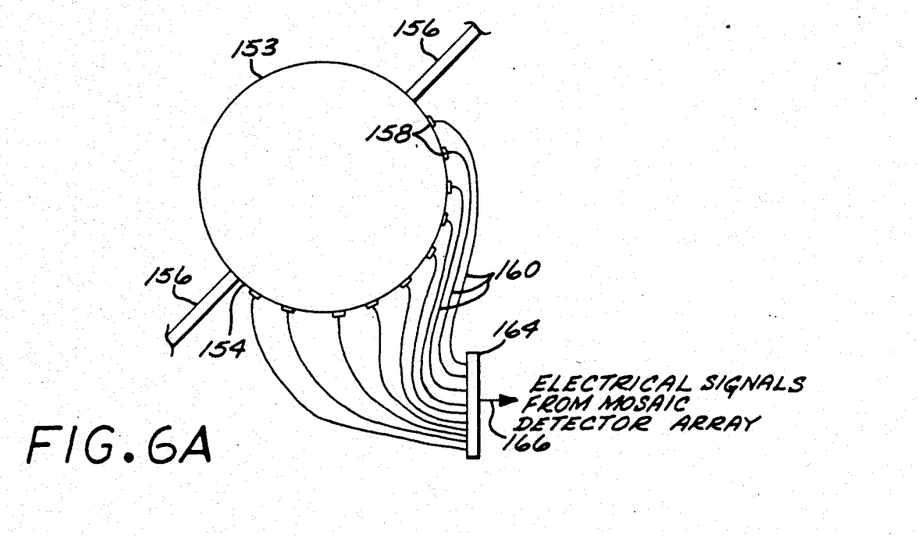
FIG. 6A shows a simultaneous hemispherical field-of-view multibeam sensor optical lens, employing optical fiber connections to semiconductor or photoelectronic detectors as the pickoff devices.
Figure 6B:
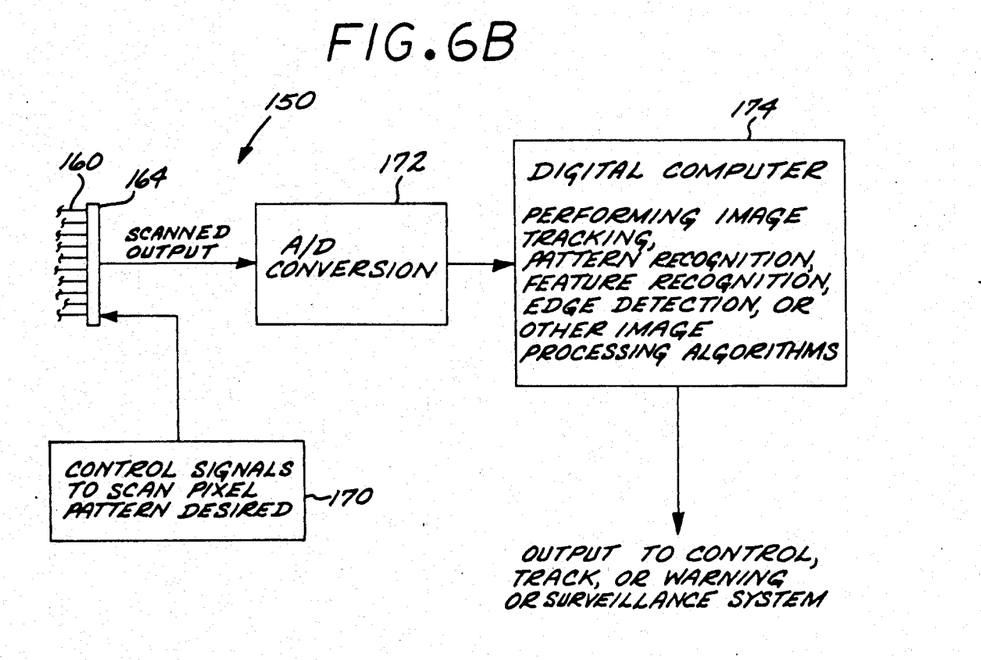
FIG. 6B shows a schematic block diagram of a sensor system employing the optical lens of FIG. 6A.

FIGS. 6A-6B show a system 150 similar to the system of FIGS. 5A-5C, except that the sensor detector elements 108 bonded to the outer surface of the lens 102 are replaced by optical fibers 160 which conduct the incident light energy at a particular focus point on the surface of the lens to a mosaic plate array 164 of semiconductor optical sensors. Optical fibers can be made smaller in cross-section than optical detectors, and may obscure less light. Optical fibers also provide a method of conveying many signals in a relatively small bundle to a secondary location when they can be converted from light to electric output with greater convenience and with less possibility of electromagnetic interference than with wire leads connected to detector elements at the lens surface.

The first hemispherical surface 153 of the aerogel Luneburg lens 152 is exposed to incident light energy. The mounting surface 156 defines the respective first and second hemispherical surfaces 153 and 154 of the lens 152. One end of each of the optical fibers 160 is secured to the particular desired focus point on the second surface 154 of the lens 152, and receive the light energy incident on the particular focus point. Optical fibers may be bonded to the lens singly or in groups by thin translucent bonding material, or if there is available room, by a mechanical clamp which presses the single fiber or conformal fiber bundle to the spherical surface.

The fibers 160 conduct the received light energy to the mosaic plate 164 comprising an array of separate photosensitive semiconductor detectors. Thus, the other end of each fiber 160 is secured to the sensor array plate 164 in such a manner as to illuminate the active area of the corresponding optical detector with the received light energy.

The mosaic focal plane array plate 164 is a flat semiconductor chip with individual sensor elements, usually in a checkerboard pattern. Such array plates are in operational use in optical surveillance systems with arrays containing thousands of elements. Information is read out of the elements comprising the focal plane array under control of electronic signals, frequently in line-by-line sequential scans like those used in home television systems. The mosaic plane array can be scanned in other ways by appropriate signals which are directed by the signal sampler 120. Optical fiber bundles are also used in this manner to display television pictures on a video screen, for example, in commercial medical sigmoid colonoscopy instruments.

The sensor array 164 is controlled by a pattern scan controller 170 to scan the pixel pattern in the desired pattern. The scanned output of the array 164 is coupled to the analog-to-digital converter 172, and the converted signals are passed to the digital computer 174 performing similar functions to those performed by the computer 140 of FIGS. 5A-5C.

Figure 7:
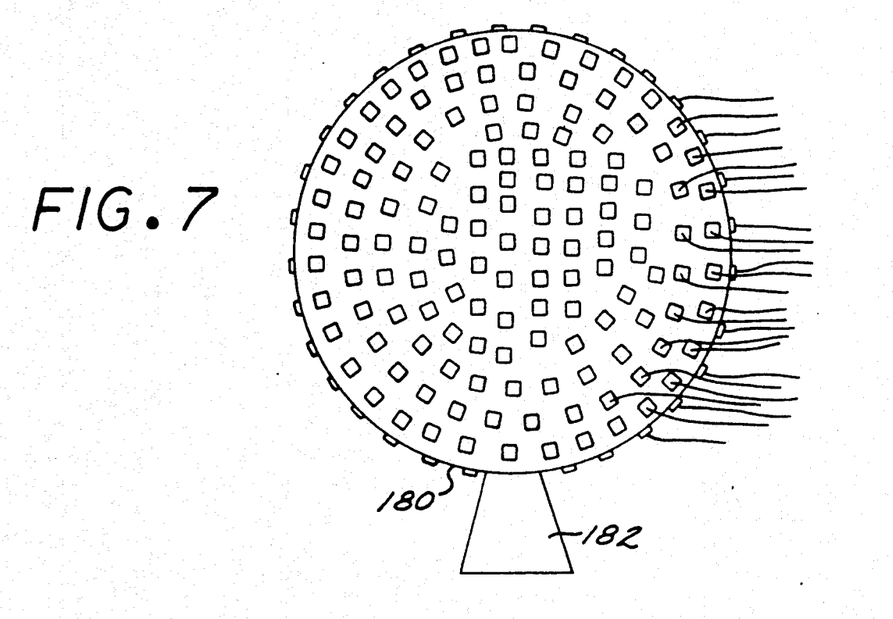
FIG. 7 shows a Luneburg optical lens capable of simultaneous multiple beam formation with a spherical field of view.

FIG. 7 illustrates an optical Luneburg lens 180 having a spherical field of view. The lens 180 is supported by a mechanical support 182 constructed to obscure as little of the spherical field of view of the lens 180 as possible. In this embodiment, the optical pickoff elements may either comprise photosensitive semiconductor elements bonded to the surface of the lens with leads connecting to the signal sampler as in FIGS. 5A-5C, or the optical fibers conducting the light energy received at a particular focus point to a detector array plate as in FIGS. 6A-6B.

Figure 8A:
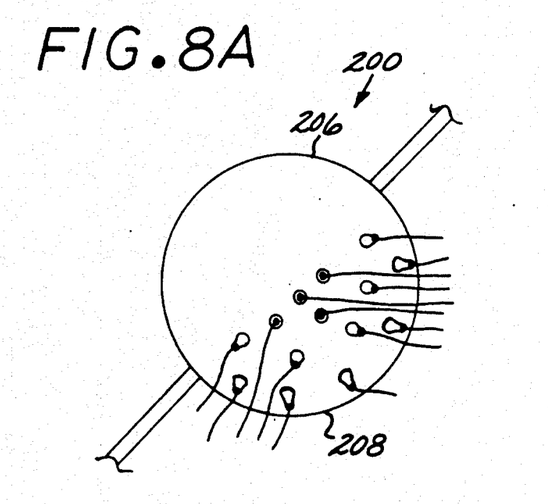
FIG. 8A shows a lens structure capable of simultaneous multibeam optical and millimeter wave or microwave operation.
Figure 8B:
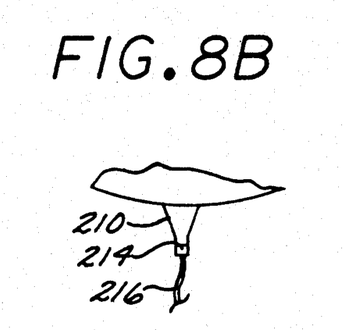
FIG. 8B shows a microwave pickoff device suitable for use on the lens sensor of FIG. 8A.

FIGS. 8A-8B illustrate a system 200 employing a simultaneous multibeam optical and millimeter wave or microwave lens 204. In this embodiment the system has a hemispherical field of view, although a system with a spherical field of view could also be constructed using the mounting bracket of FIG. 7. In this system, a plurality of millimeter wave or microwave sensors 210 and optical sensors 212 are distributed over the hemispherical surface 208 of the lens 204. The optical sensors 212 are the same type of sensors as shown with respect to the embodiment of FIGS. 5 and 6. An exemplary millimeter wave or microwave sensor element 210 is shown in FIG. 8B. The sensor 210 comprises a metal horn with a diode detector 214. Signal leads 216 connect the detector diode 214 to a signal scanner and to analog-to-digital conversion and processing elements as in FIGS. 5A-5C. The respective outputs from the optical sensors are also processed in a manner similar to that described for the embodiment of FIGS. 5A-5C.

Figure 9A:
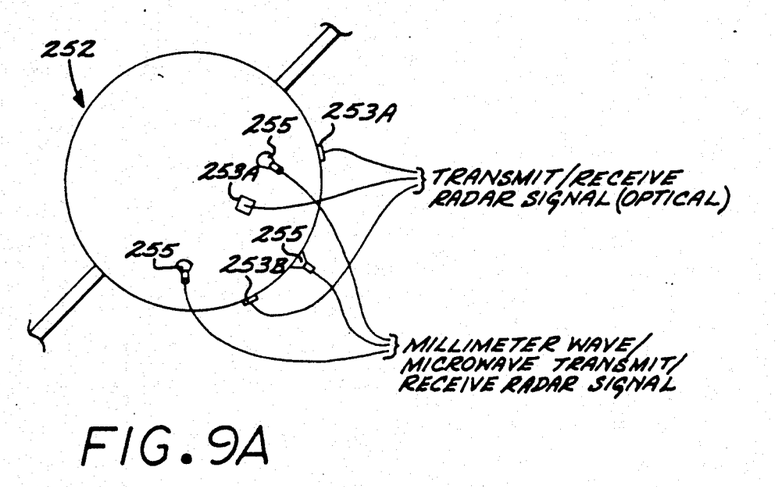
FIG. 9A shows a simultaneous multibeam optical and millimeter/microwave radar lens with a hemispherical field of view.
Figure 9B:
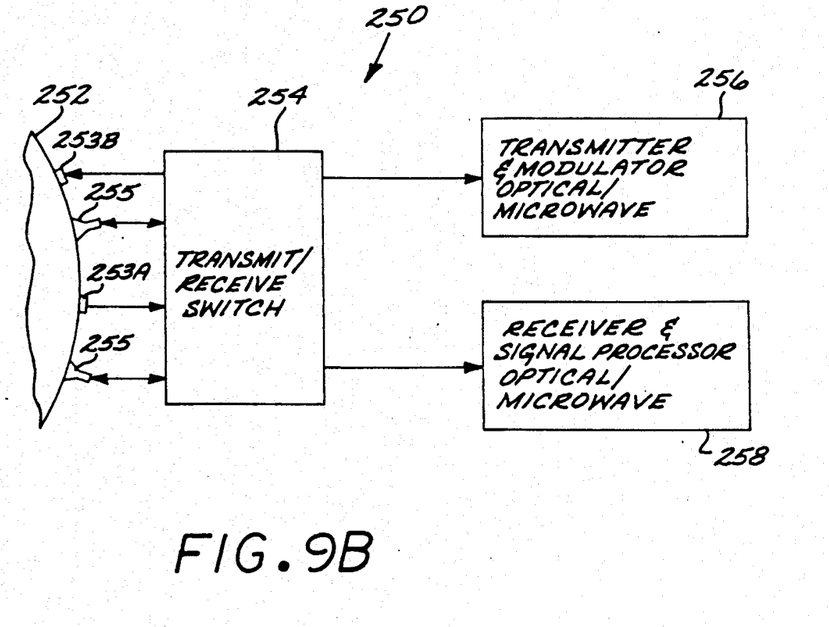
FIG. 9B is a schematic block diagram of a millimeter radar/optical radar system using the lens of FIG. 9A for transmit and receive focusing, and which can operate in either mode, or both simultaneously.

FIGS. 9A-9B show a millimeter wave/microwave and optical radar system 250 employing an aerogel Luneburg lens 252 in accordance with the present invention. The lens 252 is similar to that shown in FIG. 8A, in that it includes optical sensor and transducer units 253 as well as millimeter wave or microwave sensor units 255. The optical sensor units 253B may be equipped with laser transmitting elements, in which a laser diode is mounted on the lens spherical surface or laser light energy is conveyed to a point on the surface by an optical fiber from a remotely located laser source. Receiving optical sensors 253A as discussed for the embodiments of FIGS. 6A-6C are interspersed among the transmitting elements 253B. Thus, the system 250 is capable of transmit and receive focusing operation, and can operate in either mode.

The system 250 generally includes the lens 252, a transmit/receive switch 254, a modulator and transmitter device 256 of the optical and microwave signals, and a receiver and signal processor device 258 for receiving and processing the optical and microwave received signals.

Switch 254 is functionally equivalent to a single-pole-double-throw switch. In one position it transmits laser energy to a point on the surface and in the other position it transmits the light at that point back to the receiving sensor array. If the transmitter elements are separate and interspersed among receiving elements, the transmit function is turned on by electrical power switch to the laser source and turned off when the circuit of the receive sensor array is activated. This is a standard function used in pulsed-radar, pulsed-laser, and pulsed ultrasonic range finders.

Under ordinary circumstances transmit and receive operation is not simultaneous, although such operation can be accomplished by frequency modulation of the transmitter which allows signals to be received while transmission occurs.

It is understood that the above-described embodiments are merely illustrative of the possible specific embodiments which may represent principles of the present invention. Other arrangements may readily be devised in accordance with these principles by those skilled in the art without departing from the scope of the invention.

What is claimed is:

1. A lens comprising a plurality of concentric dielectric shells of aerogel material, arranged around a center sphere of material characterized by a refractive index of approximately $\sqrt{2}$, and wherein said lens has an outer radium $r_o$, and the radius of each shell is characterized by a typical radium value r, the respective refractive index value of each shell being an approximation to the formula $(2-(r/r_o)^2)^{\frac{1}{2}}$, said lens characterized in that planar electromagnetic wave fronts incident on said lens from a distant source are imaged at a focus point on the lens surface at the end of the diameter of the lens in the direction of the incoming wave front and that the lens provides electro-optical and radio frequency operation.

2. The lens of claim 1 comprising a plurality of optical sensor elements, each responsive to the light energy imaged at a particular point on the external surface of said lens.

3. The lens of claim 2 wherein said optical sensor elements comprise semiconductor detector elements bonded to the external surface of said lens at said particular focus points.

4. The lens of claim 2 wherein said optical sensor elements comprise optical fibers arranged for conducting the light imaged at said focus points to optically sensitive detector elements, one for each focus point.

5. The lens of claim 4 wherein said optically sensitive detector elements comprise a monolithic array of semiconductor detectors fabricated on a common substrate remotely located from the spherical surface, with signals transmitted thereto by optical fibers.

6. The lens of claim 1 further comprising a plurality of millimeter wave or microwave sensor elements responsive to the millimeter wave or microwave energy imaged at said focus points on the exterior surface of said lens.

7. The lens of claim 6 wherein said sensor elements comprise a detector diode and a microwave metal horn.

8. The lens of claim 1 wherein said center sphere material is an aerogel material.

9. A sensor system comprising:
a spherical lens comprising a plurality of concentric dielectric shells of aerogel material, arranged around a center sphere of material characterized by a refractive index of approximately $\sqrt{2}$, and wherein said lens has an outer surface radius of $r_o$, and wherein each shell is characterized by a typical radius value r, the respective refractive index value of each shell being approximately equal to $(2-(r/r_o)^2)^{\frac{1}{2}}$, said lens being characterized in that planar electromagnetic wave fronts incident on said lens from a distance source are imaged at a point on the lens surface at the end of the diameter of the lens in the direction of the incoming wave fronts and that the lens provides electro-optical and radio frequency operation;

a plurality of sensor elements each responsive to the energy imaged at a desired focus point on the external surface of said lens and providing an electrical signal indicative of the beam energy imaged at the focal point; and signal processing means responsive to the sensor electrical signals for processing said signals.

10. The sensor system of claim 9 wherein said sensor elements are responsive to optical light energy.

11. The sensor system of claim 9 wherein said sensor elements are responsive to millimeter wave signals incident on said lens.

12. The sensor system of claim 9 wherein said sensor elements are responsive to microwave signals incident on said lens.

13. The sensor system of claim 9 wherein said lens is characterized by a hemispherical field of view, the sensor elements being arranged to respond to beams incident on the lens over a hemispherical portion thereof.

14. The sensor system of claim 9 wherein said lens is characterized by a substantially spherical field of view, the sensor elements being arranged to beams incident on the lens over the spherical surface of said lens.

15. The sensor system of claim 9 wherein said processing means comprises means for processing simultaneously signals from said sensor elements.

16. The sensor system of claim 9 wherein said processing means comprises means for sampling the electrical signals generated by said sensor elements under control of pattern control signals to provide sampled sensor signals, means for generating said pattern control signals to control the sampling of said electrical signals to sample the respective beam outputs in a desired manner, means for digitizing the sampled sensor signals, and a digital computer responsive to said digitized signals to process the data received by said lens.

17. The sensor system of claim 9 wherein said center sphere material of said lens is an aerogel material.

18. The sensor system of claim 9 wherein said signal processing means comprises:

means for sampling the electrical signals from one or more selected ones of said sensor elements in response to sample control signals to sample the responses from one or more selected beams focused at particular selected directions;

means for converting the sampled signals to digital signal samples; and a digital computer for processing the digital signal samples.

19. The sensor system of claim 9 wherein said signal processing means further comprises a pattern scanner for generating said sample control signals to achieve one or more particular scan patterns.

20. A radar system comprising:

a spherical lens comprising a plurality of concentric dielectric shells of aerogel material, arranged around a center sphere of material characterized by a refractive index approximately $\sqrt{2}$ and wherein said lens has an outer radius of $r_o$, and wherein the radius of each shell is characterized by a typical radius value r, the respective refractive index value of each shell being approximately equal to $(2-(r/r_o)^2)^{\frac{1}{2}}$, said lens characterized in that planar electromagnetic wave fronts incident on said lens from a distant source are imaged at a focus point on the lens surface at the end of the diameter of the lens in the direction of the incoming wave fronts and that the lens provides electro-optical and radio frequency operation;

a plurality of radio frequency energy transducers located at a plurality of focus points about at least a portion of the external surface of the lens, said energy transducers for converting radio frequency energy received at said focus points into electrical signals and vice versa;

a transmitter coupled to said transducers for selectively exciting one or more of the transducers to produce one or more transmit beams, each corresponding to a particular transducer; and a receiver and signal processor coupled to said transducer to selectively receive return signals from one or more transducers and process said signals.

21. The radar system of claim 20 wherein said center sphere material of said lens is an aerogel material.

22. The radar system of claim 20 wherein said portion of the external lens surface about which the transducers are located extends over a hemisphere of said lens surface, wherein the system is characterized by a hemispherical field of view.

23. The radar system of claim 20 wherein said transducers are dispersed over the spherical surface of said lens, whereby said system is characterized by a substantially spherical field of view.

24. A sensor system comprising:

a spherical lens comprising a plurality of concentric dielectric shells of aerogel material, arranged around a center sphere of material characterized by a refractive index approximately $\sqrt{2}$ and wherein said lens has an outer radius of $r_o$, and wherein the radius of each shell is characterized by a typical radius value r, the respective refractive index value of each shell being approximately equal to $(2-(r/r_o)^2)^{\frac{1}{2}}$, said lens characterized in that planar electromagnetic wave fronts incident on said lens from a distant source are imaged at a focus point on the lens surface at the end of the diameter of the lens in the direction of the incoming wave fronts;

a plurality of optical sensors located at a plurality of sensor focus points about at least a portion of the external surface of the lens, said energy transducer for converting optical energy into electrical signals indicative of energy received at said focus points;

a plurality of optical transducers for emitting light energy at particular transmit focus points dispersed among said sensor focus points for emitting optical light energy in response to electrical transducer signals;

a transmitter comprising means for generating said electrical transducer signals for selectively exciting one or more of the transducers to produce one or more transmit beams, each corresponding to a particular transducer; and a receiver and signal processor coupled to said optical sensors to selectively receive signals from one or more sensor elements and process said signals.

25. The sensor system of claim 24 wherein said center sphere material of said lens is an aerogel material.

26. The sensor system of claim 24 wherein said portion of the external lens surface about which the sensors and transducers are located extends over a hemisphere of said lens surface, wherein the system is characterized by a hemispherical view of view.

27. The sensor system of claim 24 wherein said optical sensors and optical transducers are dispersed about the spherical surface of said lens, whereby said system is characterized by a spherical field of view.

28. The sensor system of claim 24 further comprising a plurality of radio frequency energy transducers located at a plurality of radio frequency focus points disposed over at least a portion of the external surface of said lens, said energy transducers for converting radio frequency energy received at said radio frequency energy received at said radio frequency focus points into electrical signals and vice versa;

a radio frequency transmitter coupled to said radio frequency transducers for selectively exciting one or more of said transducers to produce one or more transmit beams, each corresponding to a particular beam; and a radio frequency receiver and signal processor coupled to said radio frequency transducers to selectively receive radio frequency return signals from one or more said transducers and process said signals.

29. The system of claim 24 wherein said optical transducers each comprise a means for emitting laser light energy.

* * * * *